Figure 1:
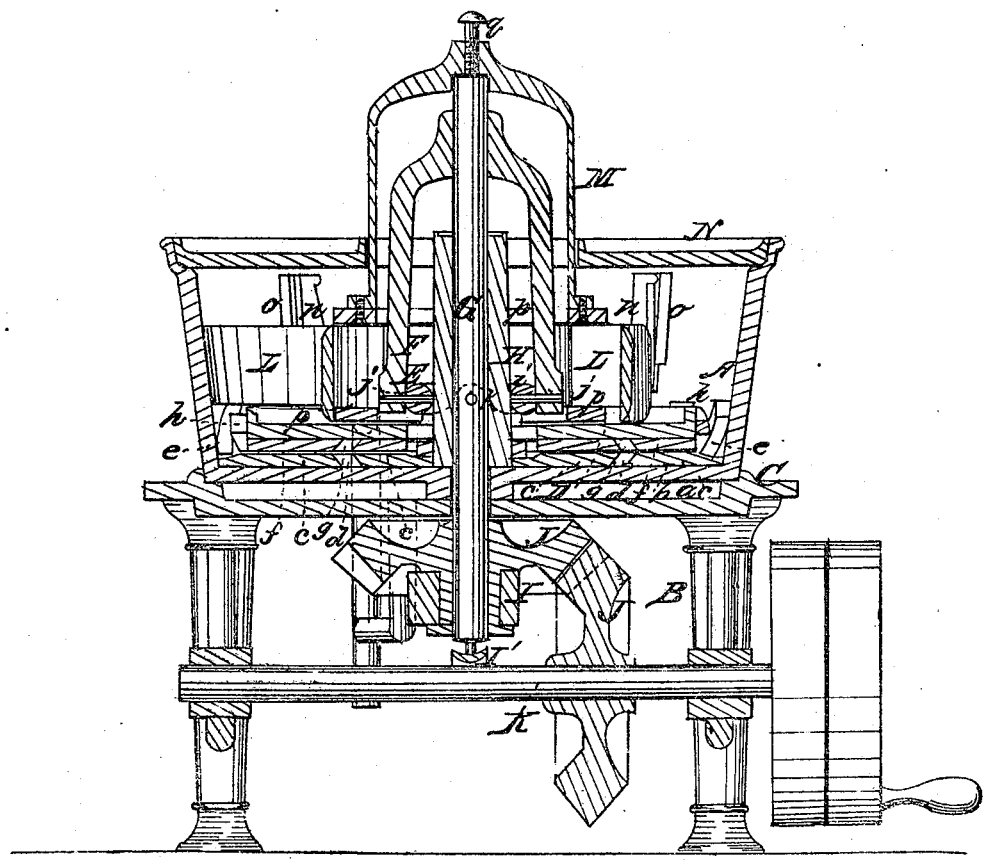

Sheet 1 - 2 Sheets.

Z. Wheeler.
Amalgamator.

Nº 40874.  Patented Dec. 8, 1863.

Witnesses
J. W. Coombs
G. W. Reed

Inventor
Zenas Wheeler
per Munn & Co.
Attorneys

Sheet 2 - 2 Sheets.
Z. Wheeler.
Amalgamator.
N° 40874. Patented Dec. 8, 1863.
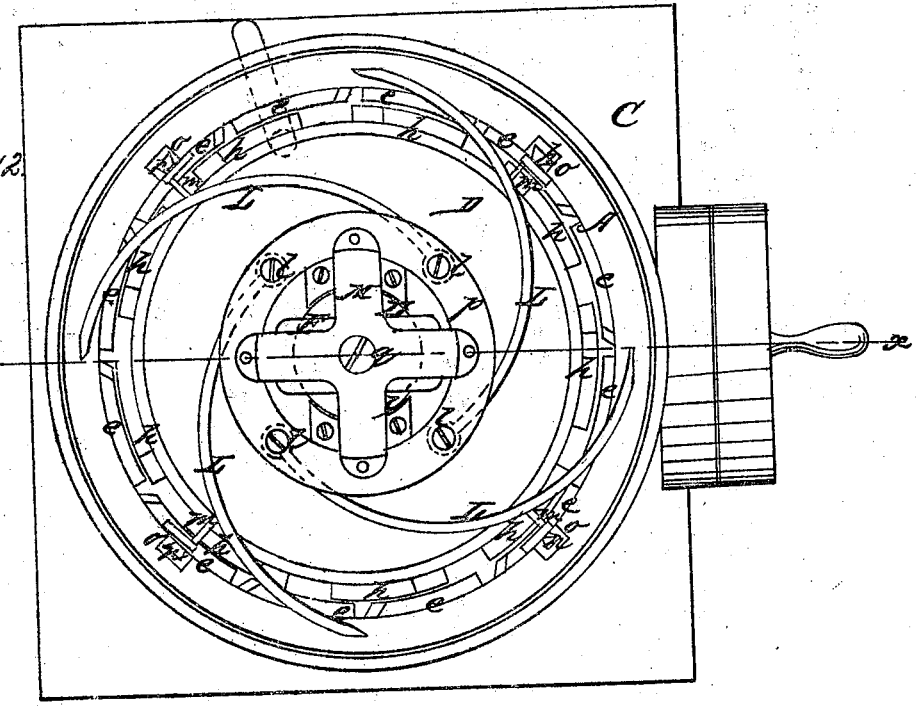
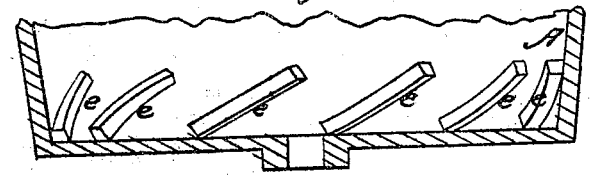
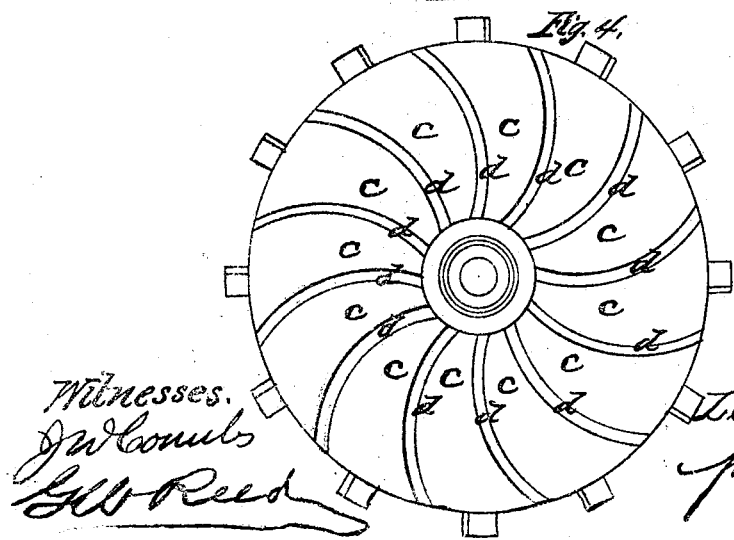
Witnesses.
Inventor.

UNITED STATES PATENT OFFICE.

ZENAS WHEELER, OF SAN FRANCISCO, CALIFORNIA.

IMPROVED MACHINE FOR AMALGAMATING GOLD AND SILVER.

Specification forming part of Letters Patent No. 40,874, dated December 8, 1863.

*To all whom it may concern:*

Be it known that I, ZENAS WHEELER, of San Francisco, in the county of San Francisco and State of California, have invented a new and Improved Gold and Silver Amalgamator and Pulverizer; and I do hereby declare that the following is a full, clear, and exact description of the same, reference being had to the accompanying drawings, making a part of this specification, in which—

Figure 1 is a vertical central section of my invention, taken in the line *x x*, Fig. 2; Fig. 2, a plan or top view of the same, with the cover of the pan removed; Fig. 3, a vertical central section of the lower part of the pan; Fig. 4, a plan or top view of the bottom of the pan.

Similar letters of reference indicate corresponding parts in the several figures.

The object of this invention is to obtain a device of simple construction, which will cause a thorough incorporation of the quicksilver with the pulp containing the metal, so as to insure a perfect amalgamation of the latter.

To this end the invention consists in the arrangement of fixed spiral ribs on the periphery of the rotatry muller and reversedly-spiral ribs on the inner side of the pan, to operate in connection with curved grooves in the face or under side of the muller and reversedly curved grooves in the bottom of the pan, as and for the purpose hereinafter fully explained.

The invention also consists in the manner of connecting the muller to its shaft by a universal joint, so as to insure its parallelism with the bottom of the pan.

The invention also consists in the employment or use of curved plates, which are placed in the pan just above the muller, and arranged in such a manner as to be capable of being adjusted higher or lower, as hereinafter fully set forth.

By means of the rotary muller and the bottom of the pan the pulp is made to pass in a continuous current or flow over the top and underneath the muller, so as to insure a perfect or thorough amalgamation of the metal contained in the ore with the quicksilver, while the curved plates are designed to prevent the pulp or ore being thrown out from the pan by the centrifugal force generated by the rotation of the muller.

To enable those skilled in the art to fully understand and construct my invention, I will proceed to describe it.

A represents a pan, which may be about four feet in diameter and about twenty-two inches in depth. This pan stands upon a frame, B, which may be of iron and provided with a horizontal iron top plate, C, having a circular depression or recess, *a*, over which the pan is placed, said depression or recess forming a steam-chamber, by which the pan is heated, in order to favor amalgamation.

The pan may be constructed of wood, provided with an iron bottom, or it may be entirely of iron. The bottom of the pan, which is designated by *b*, has a series of curved plates, *c*, attached to its upper surface. These plates *c* are of such a shape that they form curved grooves *d*, as shown in Fig. 4, the plates being placed at such a distance apart as to admit of said grooves being of a requisite width, and the sides of the plates *c* are beveled, as shown in Fig. 1, so as to be parallel with each other, but inclined.

The plates *c* may be attached to the bottom *b* of the pan in any proper way to secure them firmly in position and still admit of their ready removal when worn by use, to be re-replaced by new ones.

To the inner side of the pan A, just above the bottom *b*, there are attached a series of spiral strips, *e*. These strips are placed at equal and suitable distances apart, and extend entirely around the pan.

D represents a muller, which is formed of a circular plate or disk having a series of curved plates, *f*, attached to its under surface to form curved grooves *g*, precisely like the grooves *d* of the bottom *b* of the pan, but having a reverse position. The plates *f* are secured to the muller in any proper way that will admit of a firm connection and their ready removal or detachment from the muller when worn out by use, so that they can be replaced by new ones. To the edge or periphery of the muller there are attached a series of spiral strips, *h*, which are similar to the strips *e*, but have a reverse position to them. The muller D is attached by a universal joint, E, to a yoke, F, which is secured at its upper end to a shaft, G, said shaft passing down through an upright tube, H, which is attached to the center of the bottom *b* of the pan. The universal joint E is composed of a ring, $i$, which fits loosely on the tube H, and is provided at two opposite points with journals $j$, which work in the lower end of the yoke F, and also provided at two opposite points with journals $k\,k$, which work in bearings attached to the upper surface of the muller D. The lower end of the shaft G rests on a step, I, and directly over a lever, I', and said shaft is rotated by bevel-gears J, the driving-shaft K of which has its bearings in the frame B of the machine. The universal joint E insures the parallelism of the muller D and bottom $b$ of the pan A.

L represents a series of curved plates—four, more or less. These plates are secured at their inner ends by screws or pins $l$, and they each have a pin, $m$, projecting horizontally from them, and these pins are fitted in slides $n$, which work in guides $o$, attached to the inner side of the pan A. The inner ends of the plates L are secured by the screw or pins $l$ between two annular plates, $p\,p$, the upper one of which has a frame, M, attached to it, through the top of which a screw, $q$, passes vertically and rests on the upper end of the shaft G, as shown in Fig. 1. The pan A is provided with a cover, N, as shown in Fig. 1. The pulp is placed in the pan A, with a necessary amount of quicksilver, and the muller D rotated through the medium of the gearing previously described, the grooves $g\,d$ in the muller and bottom $b$ of the pan causing the pulp to pass out to the edge of the muller, and the spiral strips $e\,h$ forcing the pulp upward over the edge of the muller, while the curved plates L, which may be adjusted higher or lower by means of a screw, $q$, have a tendency to contract the centrifugal force generated by the rotation of the muller, and cause the pulp to pass toward the center of the upper part of the muller and down through the eye or opening at the center of the same, to be again forced outward between the muller and the bottom $b$. The grooves $g\,d$ form what may be termed a "draft," which gives a proper circulation or speed to the pulp, and admits of the same being operated upon by the muller repeatedly until all the metal contained in the pulp is amalgamated.

The pan A is provided with a series of plugs or cocks to draw off, when necessary, the contents of the pan, and the steam-chamber underneath the pan A may have steam introduced into it in any proper way. The lever I' admits of the muller D being raised, when necessary, to admit of the ready starting of the muller.

Having thus described my invention, what I claim as new, and desire to secure by Letters Patent, is—

1. The fixed spiral ribs $h$ on the periphery of the rotary muller D, and reversedly-spiral ribs $e$ on the inner side of the pan A, in combination with the curved grooves $g$ in the face or under side of the muller D, and reversedly-curved grooves $d$ in the bottom of the pan A, when arranged for joint operation in the manner and for the purpose specified.

2. Connecting the muller D to the shaft G by a universal joint composed of the yoke F and ring $i$, provided at four equidistant points around its periphery with journals $j\,j\,h\,h$, the former working in bearings in the lower end of the yoke F and the latter in boxes attached to the upper side of the muller D, as and for the purpose specified.

3. In combination with the muller D and pan A, the curved plates L, supported at their outer ends in slides $n$ and at their inner ends in a frame, M, which is supported on the upper end of the shaft G in such a manner that the plate L will follow any adjustment of the muller, and thus bear the same relation to it whether in its highest or lowest working position, as specified.

ZENAS WHEELER.

Witnesses:
RD. W. WIGGINS,
OTIS V. SAWYER.